United States Patent [19]

Shintani

[11] Patent Number: 4,691,792
[45] Date of Patent: Sep. 8, 1987

[54] METHOD AND APPARATUS FOR MEASURING NET WEIGHT OF LOAD LOADED ON VEHICLE

[75] Inventor: Fumio Shintani, Kawasaki, Japan

[73] Assignee: Kabushiki Kaisha Komatsu Seisakusho, Tokyo, Japan

[21] Appl. No.: 757,979

[22] Filed: Jul. 23, 1985

[30] Foreign Application Priority Data

Jul. 27, 1984 [JP] Japan ................... 59-155200

[51] Int. Cl.$^4$ ............... G01G 19/10; G01G 5/04; G06F 15/20
[52] U.S. Cl. ............................. 177/1; 177/141; 177/208; 364/463
[58] Field of Search .......... 177/136, 146, 141, 208, 177/1; 364/463

[56] References Cited

U.S. PATENT DOCUMENTS

| | | | |
|---|---|---|---|
| 3,331,458 | 7/1967 | Van Raden et al. | 177/141 |
| 3,428,139 | 2/1969 | Nolan . | |
| 3,513,300 | 5/1970 | Elfenbein et al. | 364/463 |
| 3,800,895 | 4/1974 | Gale et al. | 177/136 |
| 3,878,908 | 4/1975 | Andersson et al. . | |
| 3,889,767 | 6/1975 | Scott et al. . | |
| 4,230,196 | 10/1980 | Snead | 177/141 |
| 4,312,042 | 1/1982 | Bateman | 177/136 X |
| 4,456,084 | 6/1984 | Miller | 177/141 |
| 4,499,960 | 2/1985 | Ehrich et al. | 177/141 X |
| 4,635,739 | 1/1987 | Foley et al. | 177/208 X |

Primary Examiner—George H. Miller, Jr.
Attorney, Agent, or Firm—Armstrong, Nikaido Marmelstein & Kubovcik

[57] ABSTRACT

A method for measuring the weight of a load loaded in a vessel of a vehicle such as, for example, a large-sized dump truck comprises steps of detecting the axial force applied to each of suspension cylinders mounted between the vehicle body frame and axles, and then compensating or correcting the detected axial force in accordance with respective mounting angles of links of linkage mechanisms mounted in the periphery of the axle and the inclination angle of the vehicle body. An apparatus for carrying the method into practice has at least four sets of suspension cylinders, an inclination angle detector mounted on the vehicle body frame, pressure sensors each being mounted on each of the suspension cylinders, a calculation or arithmetic unit adapted to receive and calculate output signals transmitted by the inclination angle detector and the pressure sensors, and a display unit adapted to receive a signal indicative of the result of calculation transmitted by the calculation or arithmetic unit and indicate it.

5 Claims, 6 Drawing Figures

METHOD AND APPARATUS FOR MEASURING NET WEIGHT OF LOAD LOADED ON VEHICLE

BACKGROUND OF THE INVENTION

1. Field of the Invention:

This invention relates to a novel, effective method for measuring the net weight of a load loaded in a vessel of a vehicle, in particular, a dump truck, and an apparatus for carrying the method into practice.

2. Description of the Prior Art:

Large-sized dump trucks are arranged such that they can be run down slopes by actuating efficiently auxiliary brake such as engine brake etc. In such a case, it is important to measure accurately the net weight of the load on the vehicle. The control of the auxiliary brake depends mainly on the weight of the load on the vehicle.

The conventional method of measuring the weight of the load on a vehicle is to place the dump truck on a platform scale and measure the dead weight thereof, and place again the dump truck under loaded condition on the platform scale and measure the total weight thereof, and then find the net weight of the load by deducting the dead weight from the total weight. This method of measurement is disadvantageous in that measuring operation is troublesome and installation of a large-sized platform scale is required, and at dam construction sites with poor footings, it is difficult or impossible, in most cases, to install a large-sized platform scale.

U.S. Pat. No. 3,428,139 discloses an apparatus, which is alternative to the above-mentioned device using a platform scale, and which comprises an ultrasonic pulse frequency generator mounted on the underside of the bed of a truck, and an ultrasonic reflector mounted on the upper surface of an axle on which vehicle wheels are journaled in opposed relationship to said ultrasonic pulse frequency generator, the arrangement being made such that, based on the principle that as the load on the vehicle increases the distance between the ultrasonic pulse frequency generator and the ultrasonic reflector decreases, the reduced distance is measured by the ultrasonic sound wave, and then the valve thus obtained is converted into the weight of the load.

Further, U.S. Pat. No. 3,878,908 discloses means for measuring wheel load or axle load by means of a shear strain sensing transducer.

Still further, according to U.S. Pat. No. 3,889,767, there is disclosed a weighing device for providing an indication of the load applied to each of axles of the vehicle using at least a pair of electrical strain gauges mounted on the axle on which vehicle wheels are journaled.

The measuring devices disclosed in the above-mentioned U.S. patents each employ vehicle axles as their component parts. However, since dump trucks which make access to construction sites are usually required to run on slopes or inclined lands, it is necessary to provide a method and a device for measuring readily and accurately the weight of the load on them even when they are on a slope. All the measuring devices disclosed in the above-mentioned U.S. patents do not meet this requirement.

SUMMARY OF THE INVENTION

The present invention has for its object to provide a method and an apparatus for measuring readily and accurately the net weight of the load loaded on a vehicle which comprises steps of detecting the axial force applied to each of suspension cylinders mounted between the vehicle body frame and axles on which wheels are journaled, and then compensating or correcting the detected axial force in accordance with respective mounting angles of links of linkage mechanisms mounted in the periphery of the axle and the inclination angle of the vehicle body.

To achieve the above-mentioned object, according to the present invention, there is provided a method for measuring the net weight of the load loaded on a vehicle, which comprises the steps of detecting the axial force applied to each of suspension cylinders mounted between the vehicle body and axles on each of which wheels are journaled, and then compensating or correcting the detected axial force in accordance with respective mounting angles of links of linkage mechanisms mounted in the periphery of the axle and the inclination angle of the vehicle body.

To achieve the above-mentioned object, according to the present invention, there is further provided an apparatus for measuring the weight of the load on a vehicle, which comprises at least four sets of suspension cylinders mounted between the vehicle body frame and a pair of axles on which front and rear wheels are journaled, respectively; an inclination angle detector mounted on the vehicle body frame; pressure sensors each being mounted on each of the suspension cylinders; a calculation or arithmetic unit adapted to receive and calculate output signals transmitted by the inclination angle detector and the pressure sensors; and a display unit adapted to receive a signal indicative of the result of calculation transmitted by the calculation or arithmetic unit and indicate it.

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

BRIEF DESCRIPTION OF THE DRAWINGS

The accompanying drawing shows an embodiment of the present invention.

DETAILED DESCRIPTION OF THE INVENTION

The present invention will now be described in more detail with reference to the accompanying drawings.

Figure 1:
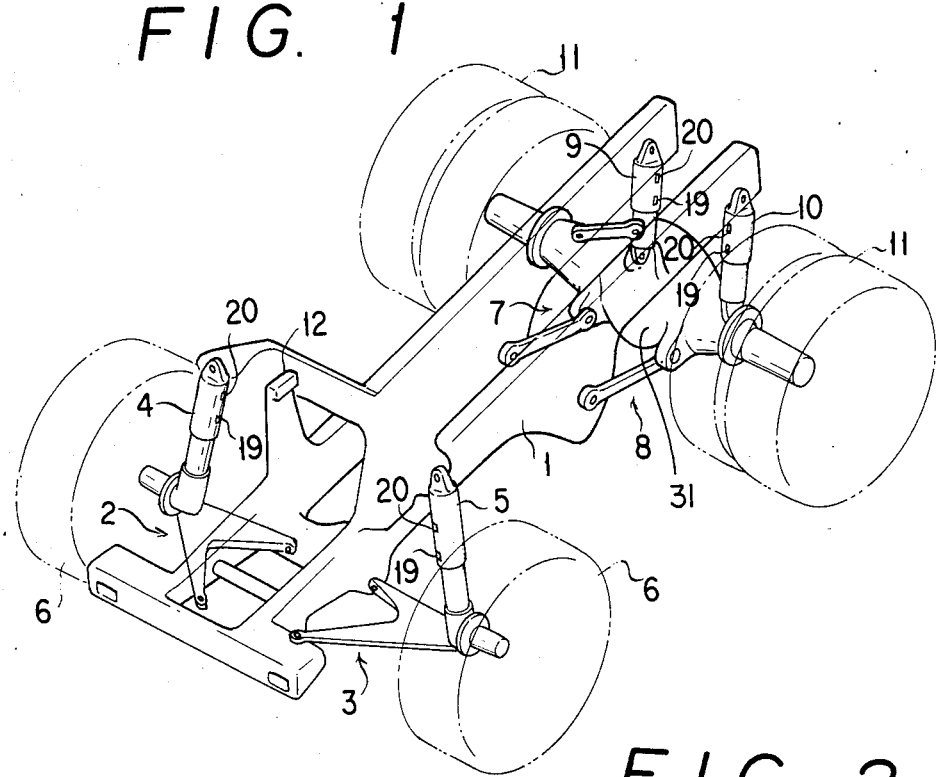
FIG. 1 is a schematic perspective view showing connecting parts of the body frame of a dump truck and wheels.

FIG. 1 is a perspective view showing connecting parts of the body frame of a dump truck and wheels.

The vehicle body frame 1 has wheels 6 mounted on the front part thereof through front, left and right linkage mechanisms 2, 3 and front, left and right suspension cylinders 4, 5, and wheels 11 mounted on the rear part thereof through rear, left and right linkage mechanisms 7, 8 and rear, left and right suspension cylinders 9, 10. The vehicle body frame 1 has also an inclination angle detector or clinometer 12 mounted thereon.

Figure 2:
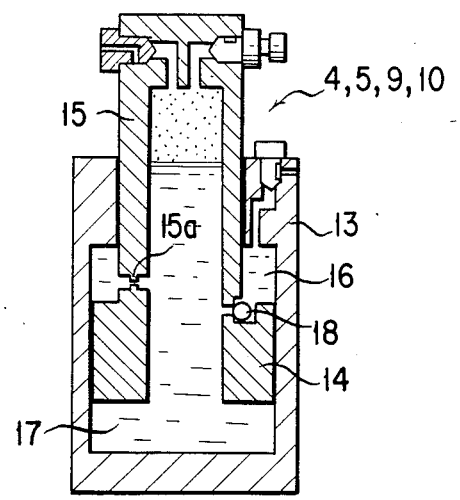
FIG. 2 is a longitudinal sectional view of a suspension cylinder.

The above-mentioned suspension cylinders 4, 5, 9 and 10 have the same configuration and shape. As shown in FIG. 2, each of the suspension cylinders has an outer cylinder 13 in which a rod 15 provided with a piston 14 is slidably mounted to thereby define a top chamber 16 and a bottom chamber 17, both of which are filled with hydraulic fluid such as oil. Both the top and bottom chambers 16 and 17 being arranged to communicate with each other through a check valve 18. The upper part of the bottom chamber 17 is charged with nitrogen ($N_2$) gas so that when an external force is exerted on the rod 15 the latter is allowed to extend outwardly or retract into the outer cylinder 13. Reference numeral 15a denotes a fixed orifice.

The suspension cylinders 4, 5, 9 and 10 are each provided with a first pressure sensor 19 and a second pressure sensor 20, respectively, so that the pressures in the top and bottom chambers 16 and 17 may be detected.

Figure 3:
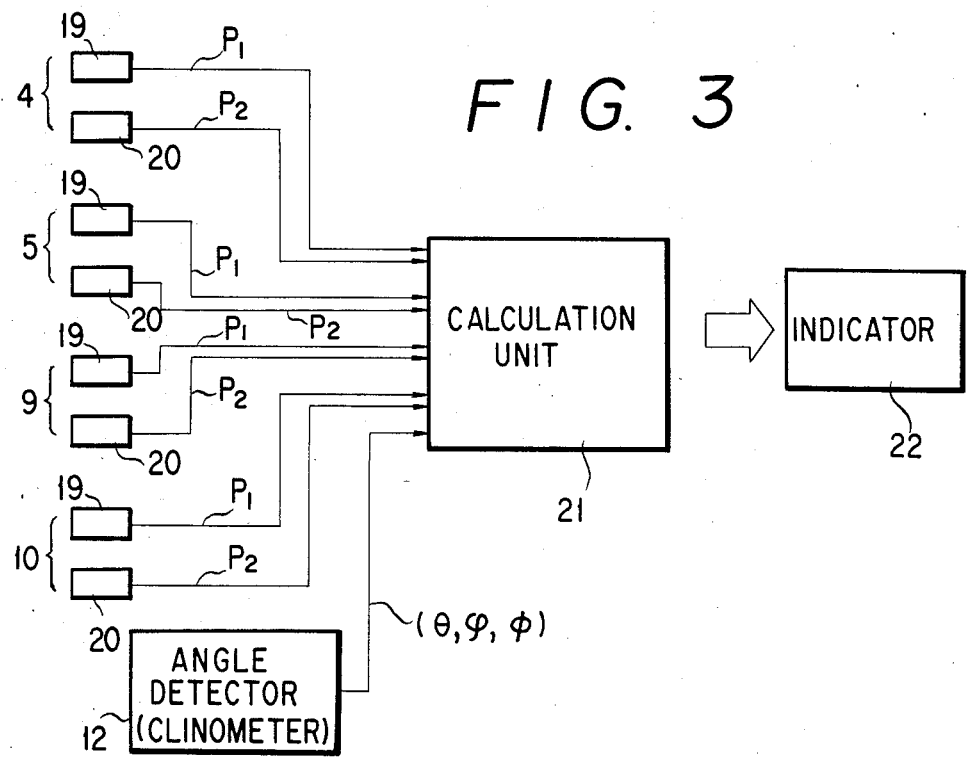
FIG. 3 shows diagramatically a control circuit for measuring the weight of the load on the vehicle.

FIG. 3 shows diagrammatically a control circuit for measuring the weight of the load on a vehicle located on a slope. The pressures $P_1$ and $P_2$ detected by the first and second pressure detectors 19 and 20 mounted on each of the suspension cylinders 4, 5, 9 and 10, and the angles of inclination $\phi$ (the inclination angle of the longitudinal axis of the vehicle on a slope) detected by the inclination angle detector 12 are input to a calculation or arithmetic unit 21 and axial forces $FS_1$, $FS_2$, $FS_3$ and $FS_4$ applied to the suspension cylinders 4, 5, 9 and 10 can be obtained by the following formula.

$$FS_1(FS_2, FS_3 \text{ or } FS_4) = K \times (P_1 \times A_1 - P_2 \times A_2) \tag{I}$$

wherein K is a coefficient of each of suspension cylinders, $A_1$ pressure receiving area of the top chamber 16, and $A_2$ pressure receiving area of the bottom chamber 17.

As an example of the measurement of the net weight of a load loaded in a vessel of a dump truck according to the present invention, the case of the measurement carried out on an uphill ground is explained hereinafter with reference to FIG. 4. And it is important to note that the entire explanation from now on is based on a two dimensional model.

Figure 4:
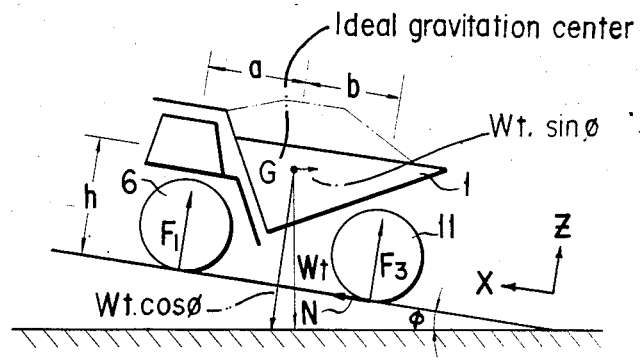
FIG. 4 is an explanatory view showing distribution of weights in the vehicle.

When, as shown in FIG. 4, the horizontal distance between a load applied to the front wheel 6, that is, an acting point of an axial force $F_1$ acting on the front axle center in the x-direction and the centre of gravity G of the vehicle is denoted by "a" and, on the other hand, that between an acting point of an axial force $F_3$ acting the rear axle center in the x-direction and the centre of gravity G in x-direction is represented by "b", and further the vertical distance between the centre of gravity G in the z-direction and the surface of the ground is denoted with "h", By considering force balance in FIG. 4 (x-direction and z-direction) and moment balance with regard to "G", the following three equations are obtained.

$$\left. \begin{array}{l} N = W_t \times \sin \\ F_1 + F_3 = W_t \times \cos \phi \\ h \times N + a \times F_1 = b \times F_3 \end{array} \right\} \tag{*}$$

(where "h", "a" and "b" are moment arms)

The axial forces $F_1$ and $F_3$ can be obtained by solving a set of simultaneous equations (*) against three unknown, namely N, $F_1$ and $F_3$, and the results is (II), (III) and (VI).

$$F_3 = (a \times \cos \phi + h \times \sin \phi) W_t/(a+b) \tag{II}$$

$$F_1 = (b \times \cos \phi - h \times \sin \phi) W_t/(a+b) \tag{III}$$

wherein $W_t$ denotes the total weight of the vehicle under loaded condition.

The reason why two sets of pressure detectors 19 and 20 are mounted on each of the suspension cylinders 4, 5, 9 and 10 is that errors resulting from the viscosity of the hydraulic fluid within each cylinder are taken in consideration.

Figure 5:
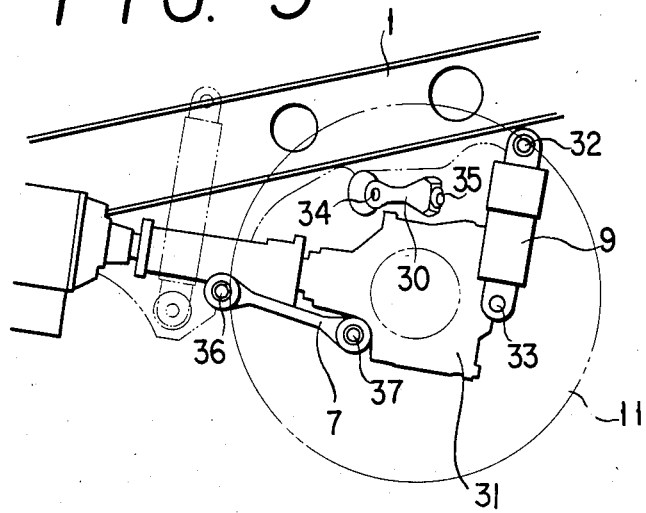
FIG. 5 is a schematic front view of a rear linkage mechanism of the vehicle.

FIG. 5 shows the shape of linkage mechanism which connects rear axle 31 to main frame 1. As is obvious from FIG. 5, the rear linkage mechanism comprises a first link 30, a second link 7 and a rear suspension 9. Wheel 11 is mounted on rear axle 31. All of these are combined to be called an under spring mechanism.

Figure 6:
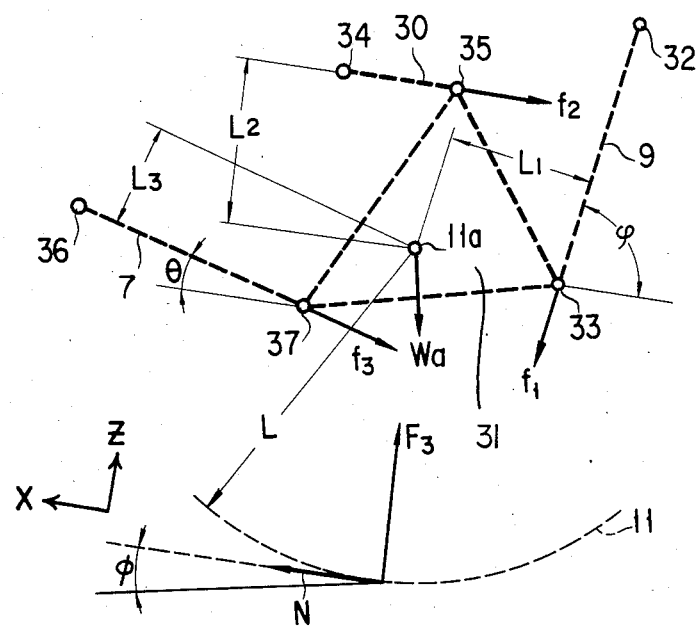
FIG. 6 is an explanatory view showing distribution of forces applied to the rear linkage mechanism shown in FIG. 5.

FIG. 6 is an explanatory view showing distribution of forces in the rear linkage mechanism shown in FIG. 5. Starting in brief, the distance between the longitudinal axis of the rear suspension cylinder 9 and a plane which passes through the centre 11a of the rear wheel and extends in parallel with the longitudinal axis of rear suspension cylinder is denoted by $L_1$; the distance between the first link 30 and a plane passing through the centre 11a and extending in parallel with the first link 30 is denoted by $L_2$; the distance between the second link 31 and a plane passing through the centre 11a and extending in parallel with the second link 7 is denoted by $L_3$; the mounting angle of the second link 7, that is to say, the angle included between the second link 7 and the ground surface is shown by $\theta$; the mounting angle of the suspension cylinder 9, namely, the angle included between the suspension cylinder 9 and the ground surface is denoted by $\phi$, and the angle of inclination of the slope is denoted by $\phi$.

In the next place, a method of measuring the net weight w of a load loaded on the vehicle will be explained. First, the dead weight $W_0$ of the vehicle under no load condition will be measured by the aforementioned formula (I).

$$W_0 = F_{10} + F_{20} + F_{30} + F_{40} \tag{IV}$$

Next, the total weight $W_t$ of the vehicle under loaded condition will be measured.

$$W_t = F_{1t} + F_{2t} + F_{3t} + F_{4t} \tag{V}$$

The weight W of the load on the vehicle is calculated by deducting $W_0$ from $W_t$, and then transmitted to a display unit or indicator 22 where digital display is made.

In this case, as aforementioned, the axial forces $F_1$, $F_2$ or $F_3$, $F_4$ are compensated with the detected inclination angle $\phi$.

In the case, it is possible to previously calibrate the dead weight $W_0$ and set it as zero point, and display the difference between the weight $W_t$ of the vehicle under loaded condition and the weight $W_0$ at zero point as the net load w.

Further, in order to measure the net load weight w on the vehicle more accurately, it is necessary to take into consideration parameters such as rolling resistance N due to the detected inclination angle $\phi$, the angle $\phi$ of the suspension cylinder relative to the ground surface, and the angle $\theta$ of the second link 31 relative to the ground surface etc. so as to satisfy dynamics balance of a dynamics system shown in FIG. 6.

The rolling resistance N resulting from the detected inclination angle $\phi$ can be obtained by the following formula.

$$N = W_t \sin \phi \qquad (VI)$$

In order to get the force applied to rear suspension 9, it is required to refer to FIG. 6.

In the relationship of dynamics balance in the dynamics system shown in FIG. 6, the following formulae can be made up (for unknowns $f_1$, $f_2$ and $f_3$):

Moment balance with regard to point 11a:

$$L \times N + L_2 + f_2 + L_1 \times f_1 = L_3 \times f_3 \qquad (IX)$$

(in which L, $L_2$, $L_1$ and $L_3$ are moment arms).

Balance in z-direction $$f_1 \times \sin \psi + f_3 \times \sin \theta + W_a \times \cos \phi = F_3 \qquad (X)$$

where $W_a$ is weight of an under spring mechanism.

Balance of x-direction $$F_1 \times \cos \psi + N = f_2 + f_3 \times \cos \theta + W_a \times \sin \phi \qquad (XI)$$

$$f_1 \times \sin \Psi + f_3 \times \sin \theta + Wa \times \cos \Phi = F_3 \qquad (X)$$

Balance of x direction.

$$f_1 \times \cos \Psi + N = f_2 + f_3 \cos \theta + Wa \sin \Phi \qquad (XI)$$

In the formulae IX to XI, character $f_1$ denotes the force applied to the rear suspension cylinder 9, $f_2$ represents the force applied to the first link 30, $f_3$ denotes the force applied to the second link 7.

By solving a set of simultaneous equations (IX), (X) and (XI), the force $f_1$ can be obtained by the following formula:

$$f_1 = h(\theta, \psi, \phi)/g(\theta, \psi, \phi) \qquad (XII)$$

Therefore, by making compensation or correction taking these into consideration, the weight of the load on a slope with raised front part can be displayed readily and accurately in digital form on the display unit 22.

Further, measurements of the axial forces on the suspension cylinders may be made by means of a plurality of strain gauges mounted in the periphery of the outer cylinder 13 or the rod 15 or by using strain gauges each mounted on a pin which pivotally connects each of the suspension cylinders and the vehicle body.

While certain representative embodiments and details have been shown for the purpose of illustrating the present invention, it will be apparent to those skilled in the art that various changes and modifications may be made therein without departing from the spirit or scope of the invention.

What is claimed is:

1. A method for measuring the net weight of the load on a vehicle, which comprises the steps of detecting the axial force applied to each of suspension cylinders mounted between the vehicle body and axles on which wheels are journaled, and then compensating the detected axial force in accordance with respective mounting angles of links of linkage mechanisms mounted in the periphery of the axle, respectively, and the inclination angle of the vehicle body.

2. The measuring method as claimed in claim 1, characterized in that said mounting angles of the links of the linkage mechanisms mounted in the periphery of the axle are the angle defined by a link connected between the vehicle body and the axle relative to the ground surface and the angle defined by each of the suspension cylinders relative to the ground surface.

3. An apparatus for measuring the net weight of the load on a vehicle, comprising at least four sets of suspension cylinders mounted between the vehicle body frame and a pair of axles on which front and rear wheels are journaled, respectively; an inclination angle detector mounted on the vehicle body frame; pressure sensors each being mounted on each of said suspension cylinders; a calculation or arithmetic unit adapted to receive and operate output signals transmitted by said inclination angle detector and pressure sensors; and a display unit adapted to receive a signal indicative of the result of operation transmitted by said operation or arithmetic unit and display it.

4. The measuring apparatus as claimed in claim 3, characterized in that the number of said pressure sensors mounted on each of the suspension cylinders is at least two.

5. The measuring apparatus as claimed in claim 3, characterized in that each of said suspension cylinders comprises an outer cylinder; a piston which is slidably mounted within said outer cylinder and the upper end of which is pivotally connected to the vehicle body frame; a bottom chamber defined between the inside of the piston and said outer cylinder; a top chamber defined between the outside of said piston and said outer cylinder, said bottom and top chambers being filled with pressurized fluid and allowed to communicate with each other through a check valve, the upper part of said bottom chamber being charged with nitrogen gas.

* * * * *